Oct. 18, 1927.  
W. EVENSEN  
1,646,056  
CYLINDER BEARING  
Filed July 2, 1923  
2 Sheets-Sheet 1
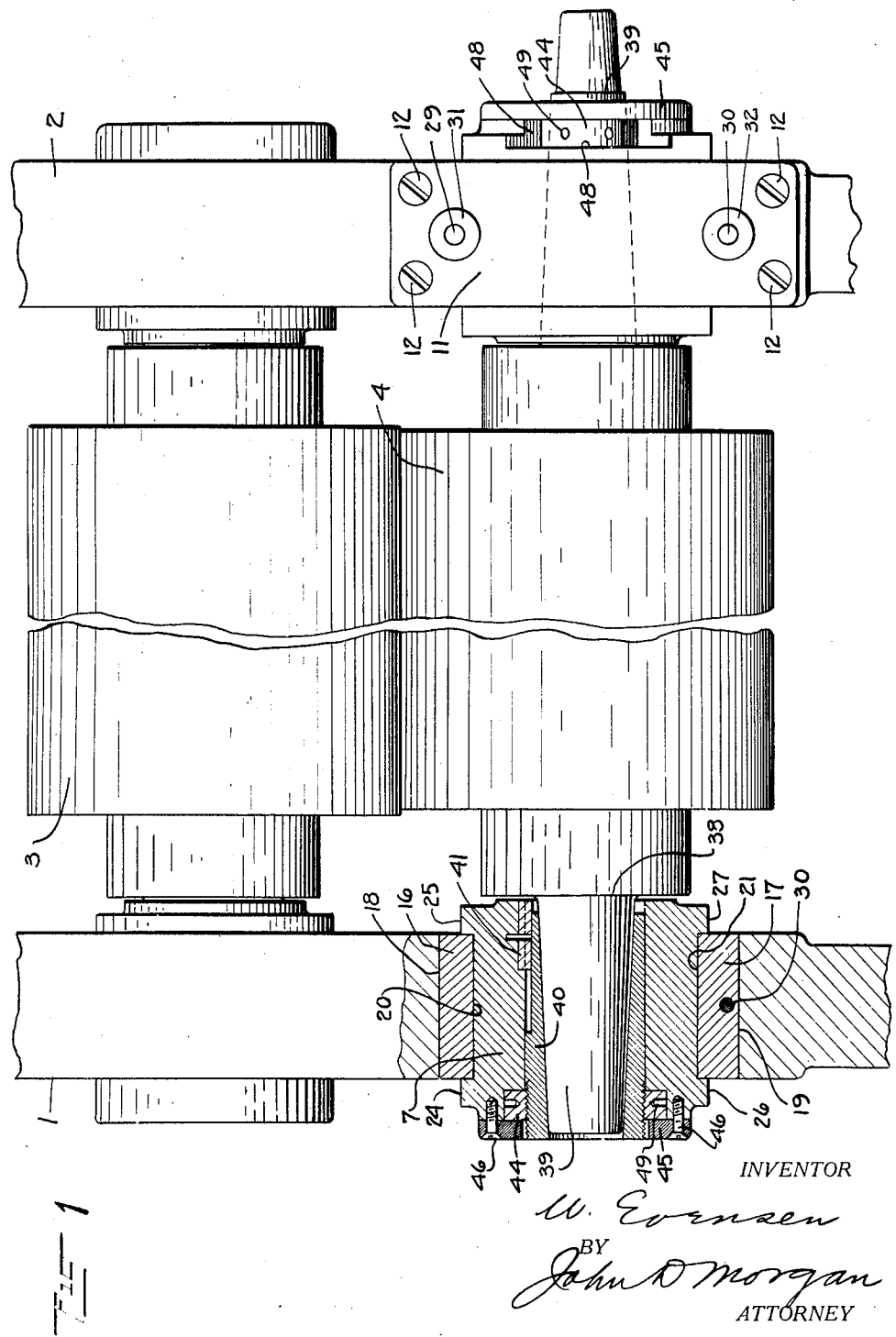

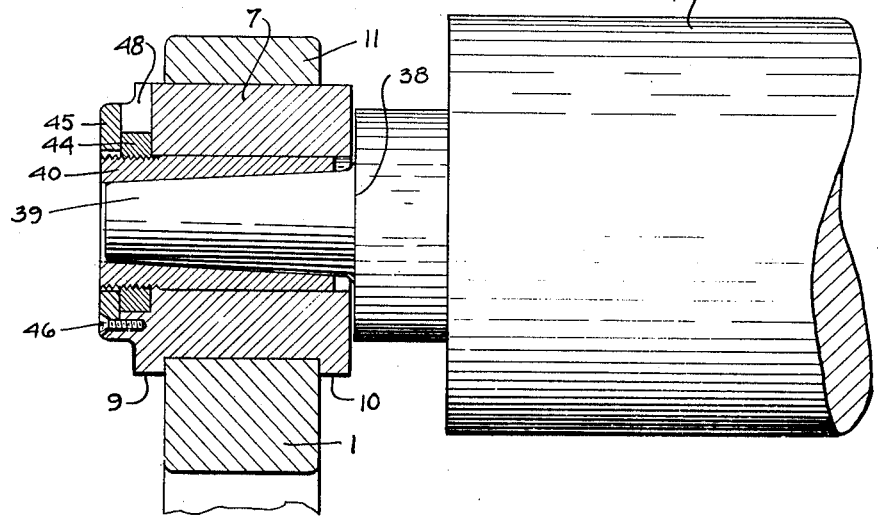
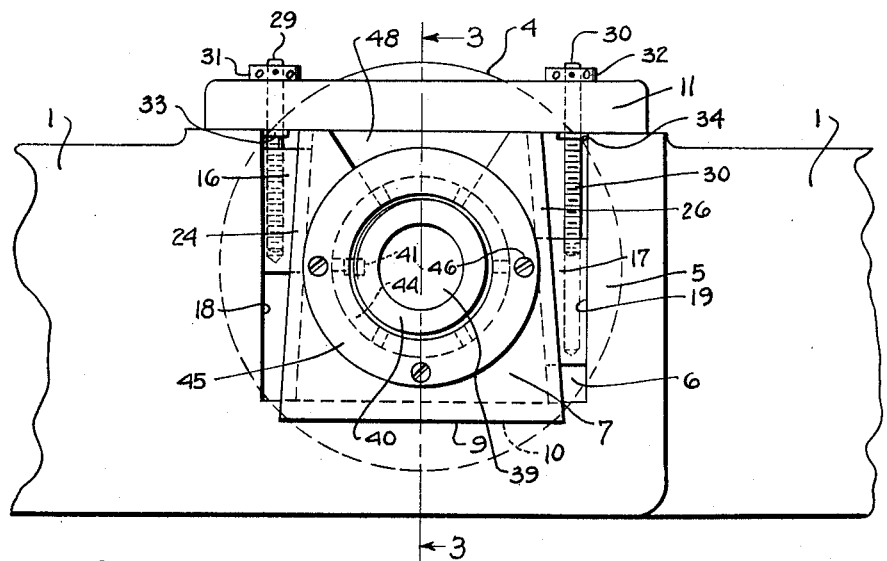
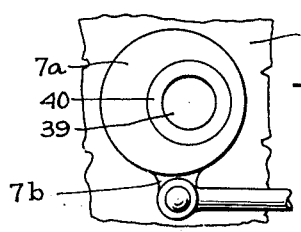

Patented Oct. 18, 1927.

1,646,056

UNITED STATES PATENT OFFICE.

WILLIAM EVENSEN, OF CHICAGO, ILLINOIS, ASSIGNOR TO GOSS PRINTING PRESS COMPANY, A CORPORATION OF ILLINOIS.

CYLINDER BEARING.

Application filed July 2, 1923. Serial No. 648,983.

The invention relates to regulating and controlling means for shaft bearings and in certain of its aspects it relates more particularly to such means as applied to the cylinders of printing presses.

Objects and advantages of the invention will be set forth in part hereinafter, and in part will be obvious herefrom, or may be ascertained by practicing the invention.

The invention consists in the novel parts, construction, arrangements, combinations, and improvements herein shown and described.

The accompanying drawings, herein referred to and constituting a part hereof, illustrate one embodiment of the invention, and together with the description serve to explain the principles thereof.

Of the drawings:

Fig. 1 is a top plan of a mechanism embodying the invention and showing one of the bearings in horizontal section;

Fig. 2 is a fragmentary side elevation of one of the bearings shown in Fig. 1;

Fig. 3 is a horizontal central section taken on line 3—3 of Fig. 2; and

Fig. 4 shows the invention applied to an eccentric bushing bearing.

Referring now in detail to the embodiment of the invention illustrated by way of example in the accompanying drawings, and showing the invention applied to a printing press, frame members 1 and 2 are provided, which rotatably support cooperating cylinders 3 and 4. One cylinder is a form cylinder and the other a co-operating impression cylinder, constituting together a printing couple.

The bearings may be all identical or substantially alike, and the description of one will be sufficient. The external member of the bearing may be of any desired form, so far as concerns certain features of the invention. As embodied, a journal box seat or bearing 5 is formed in the machine frame having a rectangular opening 6 within which the bearing is seated. The journal box 7 rests in the bearing and is provided with flanges 9 and 10 on the bottom thereof, which extend downwardly over the sides of the frames 1 and 2, respectively, to maintain the journal box laterally in position, while permitting it to move longitudinally to adjust the pressure between the cylinders. A retaining bar 11 is provided on the top side of the journal box, and this is held in position by suitable means, such as screw bolts 12, which are screw-threaded into the frame.

There is preferably provided means for moving the journal box to and fro in its seat to regulate the impression or squeeze between the cylinders. As embodied, said means comprises a pair of wedges 16 and 17 at either side of the journal box. The wedges are slidable between the side walls 18 and 19 of the seat 6 and the beveled side walls 20 and 21 of the journal box, the wedge 16 traveling between the flanges 24 and 25, and the wedge 21 traveling between like flanges 26 and 27 formed on the journal box.

The positioning wedges 16 and 17 are screw-threaded, respectively, on screw rods 29 and 30, which rods are rotatably supported in the bar 11, and have, respectively, turning heads 31 and 32. Collars 33 and 34 are fixed on the rods, below the bar 11, to maintain them longitudinally in position. By turning the heads 31 and 32, the journal box may be moved in its bearing to regulate the pressure between the cylinders.

Referring now to the means for regulating the bearings, as preferably embodied the ends of the respective shafts of the cylinder are shouldered as shown at 38. From the shoulders the shaft ends are beveled diminishing outwardly as shown at 39. Encircling the respective beveled ends 39 is a correspondingly internally beveled sleeve or bushing 40, which sleeve or bushing is carried in the central cylindrical aperture of the journal box. The bushing is preferably of less diameter throughout than the journal box. The bushing is kept from rotation in the journal box by suitable means, such as a key 41.

Means are provided by the invention for effecting relative axial movement between the bushing and its journal box. In the embodied form thereof, on its outer end, the bushing is externally screw-threaded, and a nut or ring 44 is internally screw-threaded on this part of the bushing. Means are also provided for restraining the nut from axial movement, and as embodied, the nut is seated in a circular seat formed within the exterior side face of the journal box.

A retaining ring 45 is fixed to the outer face of the journal box by suitable means, such as screws 46, to hold the nut 44 in longitudinal position while permitting it to rotate, the central opening of the ring being of preferably greater diameter than the exterior of the bushing. The journal box is open at the upper part thereof, as shown at 48 in Figs. 1 and 2, to afford peripheral access of a turning bar to nut 44, and the nut is provided with holes 49 to take the turning bar, so that the nut may be rotated to regulate the longitudinal position of the cylinder.

In Fig. 4, the invention is shown applied to an eccentric bearing for the purpose of regulating the impression squeeze between the cylinders of the printing couple. The eccentric sleeve or bushing 7ª takes the place of the journal box 7 with its wedge adjustment mechanism. Any known or suitable holding and positioning mechanism may be applied to the eccentric sleeve or bushing 7ª, and such a mechanism is indicated at 7ᵇ. The ring 45 is omitted in this view for the sake of clearness.

When the nut 44 is turned the tapered bushing 40 is moved which takes up or relieves the bearing. The clearance between the ends of the cylinder and bearings is usually very small. If the bearing on the left hand side is taken up it will force the cylinder against the right hand box and by this means the operator can tell when the bearing is taken up. The other bearing can then be treated in the same way. As a matter of fact, the bearing can be taken up just so that it will not heat, and it will then run as close as possible and still not suffer any injury caused by heating.

A bearing of this kind is more easily kept tight, which of course, would result in the cylinders running true and thus improve the printing. The bearing will also wear round or true, which would mean longer life for the bearing. If the taper bearing is kept tight, the shaft will find its own center and thus the bearing will wear round or true which will result in a longer life of the bearing.

This taper bearing as applied to printing would permit a more solid construction, because, it is not split. It is preferably mounted in a solid square block in the case, the block being of wedge construction; and in a solid bushing, in the case of the eccentric bushing construction for impression.

The taper bearing would permit taking up the wear in the eccentric bushing construction. It is not possible to take up the wear in the eccentric bushing construction when a straight bushing is used. The taper bearing can be renewed and brought up tight without opening the box; and in case of the eccentric bushing construction, the taper bearing can be renewed and brought up tight, which is not possible with the straight bushing. Furthermore, the taper bushing makes a more convenient and less expensive bearing to keep in proper working order.

In the structure of Fig. 4, if desired, the bushing 40 may be omitted, and a tapered opening made directly in the sleeve 7ª. The sleeve 7ª can then be moved longitudinally in the frame and the same results can be accomplished without the bushing. The means for effecting the longitudinal movement in this case would act on or coact with the sleeve 7ª.

The invention in its broader aspects is not limited to the specific mechanisms shown and described but departures may be made therefrom within the scope of the accompanying claims without departing from the principles of the invention and without sacrificing its chief advantages.

What I claim is:—

1. A shaft bearing for the shaft of a printing press cylinder including in combination a journal box, a bushing therein having an internal aperture beveled decreasingly outwardly to journal a similarly beveled shaft, means preventing rotation of said bushing in said journal, means for axially shifting the shaft comprising a screw-thread on the outer end of the bushing, a nut screwed onto said screw-thread, and means preventing axial movement of the nut relative to the journal box comprising a nut abutment seat on the exterior face of said journal box, and a cap secured to said journal box and holding said nut thereagainst.

2. A shaft bearing for the shaft of a printing press cylinder including in combination a journal box, a bushing therein having an internal aperture beveled decreasingly outwardly to journal a similarly beveled shaft, said journal box throughout its interior being of greater diameter than said bushing, means preventing rotation of said bushing in said journal, means for shifting said bushing and its shaft axially with respect to said journal box comprising a screw-thread on the outer end of the bushing, a nut screwed onto said screw-thread, and means preventing axial movement of the nut relative to the journal box comprising a nut abutment seat on the exterior face of said journal box and cooperating means secured to the outer face of said journal box and comprising a cap having an opening of greater interior diameter than the diameter of said bushing and holding said nut against its journal box abutment seat.

3. A shaft bearing for the shaft of a printing press cylinder including in combination a journal box, a bushing therewithin having an internal aperture beveled decreasingly outwardly, to journal a similarly beveled shaft, means for moving the bushing longitudinally relatively to the shaft, including a screw-thread on the exterior end of the bushing and a nut screwed onto said screw-thread, and the journal box being shaped to permit peripheral access of a turning tool to the nut.

4. A shaft bearing for the shaft of a printing press cylinder including in combination a journal box, a bushing therewithin having an internal aperture beveled decreasingly outwardly, to journal a similarly beveled shaft, means for moving the bushing longitudinally relatively to the shaft, including a screw-thread on the exterior end of the bushing and a nut screwed onto said screw-thread, and means preventing axial movement of the nut relatively to the journal box, the journal box being shaped to permit peripheral access of a turning tool to the nut.

5. A shaft bearing for the shaft of a printing press cylinder including in combination a journal box, a bushing therewithin having an internal aperture beveled decreasingly outwardly, to journal a similarly beveled shaft, means for moving the bushing longitudinally relatively to the shaft, including a screw-thread on the exterior end of the bushing and a nut screwed onto said screw-thread, said nut having a seat in the exterior face of the journal box, the journal box being shaped to permit peripheral access of a turning tool to the nut.

6. A shaft bearing for the shaft of a printing press cylinder including in combination a journal box, a bushing therewithin having an internal aperture beveled decreasingly outwardly, to journal a similarly beveled shaft, means for moving the bushing longitudinally relatively to the shaft, including a screw-thread on the exterior end of the bushing and a nut screwed onto said screw-thread, one face of said nut having a seat in the exterior face of the journal box, and means abutting the opposite face of said nut for keeping the nut in its seat comprising a flat abutment plate secured to the exterior face of the journal box, said journal box having a radial cutaway portion in its outer face affording access to said nut.

7. A shaft bearing for the shaft of a printing press cylinder including in combination a journal box, a bushing therewithin and of less diameter throughout than the enclosing aperture of the journal box, said bushing having an internal aperture beveled decreasingly outwardly, to journal a similarly beveled shaft, and means for moving the bushing longitudinally relatively to the shaft, including a screw-thread on the exterior end of the bushing and a nut screwed onto said screw-thread, the journal box being shaped to permit peripheral access of a turning tool to the nut.

In testimony whereof, I have signed my name to this specification.

WILLIAM EVENSEN.